United States Patent [19]

Bond

[11] 4,074,607

[45] Feb. 21, 1978

[54] MUSIC MAGIC CIRCULAR CALCULATOR

[76] Inventor: Charles Stephen Bond, 2625 Whites Point Drive, San Pedro, Calif. 90732

[21] Appl. No.: 500,386

[22] Filed: Aug. 26, 1974

[51] Int. Cl.² ............................................. G09B 15/02
[52] U.S. Cl. ................................................ 84/471 SR
[58] Field of Search .................................. 84/470–475, 84/477 R

[56] References Cited

U.S. PATENT DOCUMENTS

| 554,172 | 2/1896 | De Meules | 84/473 |
| 2,193,885 | 3/1940 | Riley | 84/471 |
| 2,542,235 | 2/1950 | Clopton | 84/474 |
| 3,728,932 | 4/1973 | Leonard | 84/473 |
| 3,771,409 | 11/1973 | Rickey | 84/471 |
| 3,884,114 | 5/1975 | Leonard | 84/471 |

*Primary Examiner*—John Gonzales

*Attorney, Agent, or Firm*—Fulwider, Patton, Rieber, Lee & Utecht

[57] ABSTRACT

There is disclosed a device of the calculating rule type that is useful in music analysis to assist in spelling chords and determining scales, transposing of chords or notes, identifying key signatures, determining minor keys relative to their major keys, performing chord analysis, determining relationships among chords, and writing of music. The device comprises a base plate member with at least one movable member mounted thereon. There is provided a plurality of 12 indicia representative of the 12 notes of an octave of the musical scale disposed on one of the members in a linear, circle of fifths progression. The other of the members bears an index mark and a plurality of 11 calibration marks in linear progression thereon. Also disposed on the other of the members is a plurality of indicia cooperative with the first plurality of indicia to perform the functions of spelling of chords and scales and of transposing of chords or notes.

13 Claims, 3 Drawing Figures

MUSIC MAGIC CIRCULAR CALCULATOR

BACKGROUND OF THE INVENTION

1. Field of the Invention

This invention relates to a calculating device and, in particular, to a device useful for spelling, analyzing and transposing musical chords or scales.

2. Description of the Prior Art

There have been provided a large number of devices, including devices of the circular rule variety, for the assistance of musical chord and scale analysis. A number of these devices have the musical scale presented in a chromatic order such as described in U.S. Pat. Nos. 10,217; 1,804,460; 148,097; 337,320; 3,572,302 and 3,592,099. Other devices have employed the circle of fifths progression, i.e., every fourth note of the musical scale, such as U.S. Pat. No. 1,602,204; 2,542,235; 3,472,117 and 3,728,932. The aforementioned calculating devices are not ideally suited for use by novices in the musical field because of an overly complex treatment and arrangement of the musical scales or because the devices are over simplified and fail to provide all the desirable functions in chord spelling, transposing and/or analysis. In particular, it is desirable to provide a simple device having the minimal amount of indicia thereon for performing the functions of spelling and transposing of musical chords or notes and for performing the necessary information useful in chord analysis and identification of musical chords from key signatures. The combining of these functions into a simple, direct reading device would permit use of the device for musical instruction to novices as well as for use as a tool in music composition by accomplished musicians.

BRIEF DESCRIPTION OF THE INVENTION

This invention comprises a device which is useful in music instruction to novices as well as a tool for music writing by experienced musicians. The device performs the functions of spelling of musical chords and, determining scales, transposing chords or notes, identifying chords or scales from key signatures, determining minor keys relative to their major keys, determining relationships among chords, and analysis of chords from partial or incomplete identification of notes of the chord.

Briefly, the invention comprises a first base member and a second movable member mounted thereon. In its preferred embodiment, the movable member comprises a disc that is rotatably mounted on the base member. One of these members bears a plurality of 12 indicia, representative of the 12 notes of an octave of the musical scale which are disposed thereon in a linear, circle of fifths progession, while the other of the members bears an index and 11 calibration marks in linear progression which are cooperative with the twelve musical not indicia. Indicia are provided at the index, fourth and first calibration marks to indicate the three tones of a major musical triad in its first position. As presented herein, all discussion of the order of notes in a chord will refer to the chord in its first position. Various or all of the remainder of the calibration marks can bear suitable indicia to perform other identification functions. An indicium can be provided at the tenth calibration mark to identify the fourth note of a dominant seventh chord. An indicium can be provided at the ninth calibration mark to identify the second note, being the lowered third, of a minor triad chord, or the second note of a diminshed chord. An indicium can be provided at the eighth calibration mark to identify the third note of an augmented fifth chord. An indicium can be provided at the seventh calibration mark to identify a flatted ninth note of a musical chord while an indicium can be provided at the sixth calibration mark to identify a flatted fifth note of a chord or the third note of a diminshed chord. An indicium can be provided at the fifth calibration mark to identify the fourth note of a major seventh chord. An indicium can be provided at the third calibration mark to identify the fourth note of a diminshed seventh chord and an indicium can be provided at the second calibration mark to identify the second degree of the major scale or the added ninth note of a musical chord. Additionally, the calculating device can be provided with indicia to identify the root tone of chords related to the key opposite the index calibration mark. To this end, the index bears a tonic indicium and the first and fourth calibration bear dominant and subdominant indicium, repectively, which identify the root notes of the tonic, dominant and subdominant triads. Optionally, indicia are provided at the second, fourth, third and fifth calibration mark to identify the root notes of the supertonic, mediant, and submediant traids and the leading tone of the scale defined by the note appearing at the index mark. Optionally, the circle of fifths progression of the musical note indicia can be associated with key signature indicia and the circular array of the musical note indicia can be divided into two semicircle progressions characterized by either sharps or flats in the key signatures.

BRIEF DESCRIPTION OF THE DRAWINGS

The invention will be described by reference to the drawings of which.

DESCRIPTION OF PREFERRED EMBODIMENTS

Figure 1:
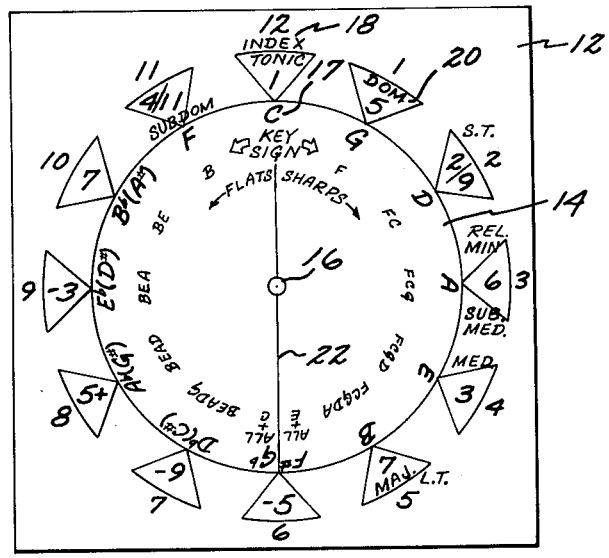
FIG. 1 illustrates the device with the musical note C positioned at the index mark.

The presently preferred embodiment of the invention is illustrated in FIG. 1 as comprising a first, base member 12 with a circular member 14 rotatably mounted thereon at pivot 16. Disposed in a circular array about the periphery of disc 14 are musical note indicia 17 arranged in a circle of fifths progression, i.e., in the progression of: C, G, D, A, E, B, F sharp (G flat), D flat (C sharp), A flat (G sharp), E flat (D sharp), B flat (A sharp), and F. These indicia are arranged in a linear progression, i.e., at hourly clock positions in the circular array.

The base member 12 bears an index 18 at the 12 o'-clock position and a circular array of eleven calibration marks disposed in an orderly progression therefrom in a clockwise direction. These calibration marks are shown as a plurality of triangles 20 that are disposed in a circular array about base member 12 at each of the hourly clock positions. Associated with each of the triangles 20 is a suitable indicium or indicia which identify certain relationships of musical note or chord indicia 17 carried on disc 14 to the note indicium opposite index 18. For this purpose a plurality of Arabic numerals can be placed within the triangles 20 at appropriate positions about the circular array of the triangles so as to identify various orders of musical notes or chords.

The musical tones of a major triad, the root of which is rotated to a position beneath the index can be identified by the triangles labeled as 1, 3 and 5 which are located at the index and the fourth and first, respectively, calibration marks therefrom. Thus, the major triad of the C major scale is identified as notes C, E and G which are opposite the 1, 3 and 5 indicia, respectively, within triangles 20. The numeral 7 is placed within the triangle 20 at the tenth calibration mark to identify the fourth tone of the dominant seventh chord which, for the major scale of C, is B flat. In the preferred embodiment, the various triangles are also color coded and the triangles with numerals 1, 3 and 5 appear in a warm color, e.g., red, to associate the triangles used in identification of the major triad chord. The triangle with numeral 7 can be similarly colored or, preferably, can be of pink coloration indicating that it is an added note to the major traid. The triangle at the ninth calibration mark is identified with the indicium minus 3 and can be colored with a complimentary color of red, e.g., green, since playing the minor third in a triad produces an opposite sound. The minus sign is employed to indicate the minor scale or, as hereafter mentioned, a flatted note. The indicium in the triangle at the ninth calibration mark is thus used with the indicia at the index and first calibration mark to identify the tones of the minor triad of the root note which is positioned at the index. Thus, for the key of C, as illustrated, the minor triad is C, E flat and G, which notes are opposite the index and the indicia at the ninth and first calibration marks, respectively. This indicium also functions as described hereinafter to identify the second note of a diminished chord of the root tone at the index.

The indicium 5+ is placed in the triangle at the eighth calibration mark to cooperate with the index and the indicium 3 at the fourth calibration mark to identify the notes of an augmented fifth chord. As illustrated, these indicia identify, for the key of C, that the augmented fifth chord is C, E and G sharp. The triangle bearing the 5+ indicium is further identified with color coding in organe, a warm color, since as augmented (+5) traid has a warm, hopeful sound. The indicium minus 5 is placed at the sixth calibration mark and is copperative with the indicia at the index and the ninth calibration mark to identify the notes of a diminished chord. This indicium is also useful to identify a flatted fifth note. The triangle is color coded in blue, a cool color since chords built on these notes are cool and jazzy in sound. Again, for the key note of C, the diminished chord is formed from tones at the index, ninth and sixth calibration marks, respectively. The indicium major seventh is placed at the fifth calibration mark to cooperate with the indicia at the index, fourth and first calibration mark to identify the notes of the major seventh chord of the root tone placed at the index. This triangle is also color coded in blue to indicate cool and jazzy sounds that are produced by these notes. Thus, the major seventh chord for the key of C can be seen to be C, E, G, B by use of these indicia. The indicium relative minor six is placed in the triangle at the third calibration mark and is cooperative either with the index, 4th and 1st to form the sixth chord or with the indicia at the index, ninth and sixth calibration marks to identify the notes of the diminshed seventh chord of the root tone placed at the index. This triangle is color coded in violet, a somber color since minor keys produce somber music. Again, for the key note of C, the sixth chord is thereby identified as C, E, G and A and the diminished seventh chord is thereby identified as C, E flat, G flat and A. This indicium also functions to identify the minor key relative to the major key at the index.

The indicia 2/9 are placed in the triangle at the second calibration mark to identify either the second degree of the scale indexed or the added ninth note to a chord. This triangle is also color coded in light blue, a cool color since chords having an added ninth note are cool or jazzy in sound. The indicia 4/11 are placed in the triangle at the eleventh calibration mark to identify either the fourth degree of the scale indexed or an added eleventh note of a chord. Since fourth and eleventh chords suggest change or resolution to another chord, this triangle is color coded in gray, a neutral color which suggests change. The indicium minus 9 is placed in the triangle at the seventh calibration mark to identify the added flatted ninth note of the key note positioned opposite the index. This triangle is color coded in light blue to register that chords built thereon have a cool, jazzy sound.

There can also be associated with the aforementioned device indicia that identify relationships of other chords to the chord whose root note is placed at the index. The indicia that can be used comprise the abbreviations or other symbols to identify forms of the tonic, dominant and subdominant chords. To this end, "TONIC" can be placed on the triangle at the index and abbreviations DOM. for dominant and SUBDOM. for subdominant traids can be placed at the first and eleventh calibration mark, respectively. Other chords can be identified if desired and, accordingly, the initials ST., for supertonic, can be placed at the triangle of the second calibration mark; SUBMED., for submediant, can be placed at the third calibration and MED., for mediant can be placed at the fourth calibration mark. All of these indicia identify the root note of the indicated triad or its alterations of the major scale to the key note that is placed at the index. The complete triad can be obtained simply by rotating disc 14 to place the indicated root note of the triad beneath the index. Thus the dominant triad of the key of C can be spelled by rotating disc 14 to place the key note G beneath the index. The complete triad can then be read by observing the notes opposite the first, fifth and third indicia to be G, B and D.

Various other inidicia can be placed on the calculating device. If desired, disc 14 can be subdivided into two semicircles indicating that the key signatures characterized by sharps appear in a progressive clockwise direction while the notation "flats" can be placed in the opposite semicircle with a directional arrow to indicate that key signatures characterized by flats occur in a progressive counterclockwise direction.

The operation of the calculating device thus described is readily apparent from the preceding description. To illustrate, the major triad of the C scale can be formed by reading the notes opposite the index and three and five indicia to reveal this triad to be C, E and G. Similarly, the minor triad of the C scale can be observed to be C, E flat and G by observing the notes which are opposite the index and minus three and five indicia. The augmented C chord can be observed to be C, E and G sharp which are opposite the index and three and five plus indicia. The diminshed chord build on the C note can be observed to be C, E flat and G flat which are the notes opposite the index and the minus (three) and minus (five) indicia. The dominant seventh chord of the C scale can be observed to be C, E, G and B flat which are the notes opposite the index and the three, five and seven indicia. The diminshed seventh chord of the C scale can be observed as C, E flat, G flat and A which are the notes opposite the index, and minus three, minus five, and six indicia. The major seventh chord of the C scale can be observed to be C, E, G and B which are the notes opposite the index and three, five and seven major indicia. The seventh chord with an added ninth can be observed to be C, E, G, B flat and D which are the notes opposite the index and three, five, seven and nine indicia. The seventh with a flatted ninth chord of the C scale can similarly be seen to be formed of the notes C, E, G, B flat and D flat which are the notes opposite the index and three, seven, and minus nine indicia. Similarly, the seventh chord with an added eleventh note can be observed to be C, E, G, B flat and F which are the notes opposite the index and three, five seven and eleven indicia. The seventh chord with a flatted fifth can also be observed to be C, E, G flat and B flat which are the notes opposite the index, three, minus five and seven indicia.

Figure 2:
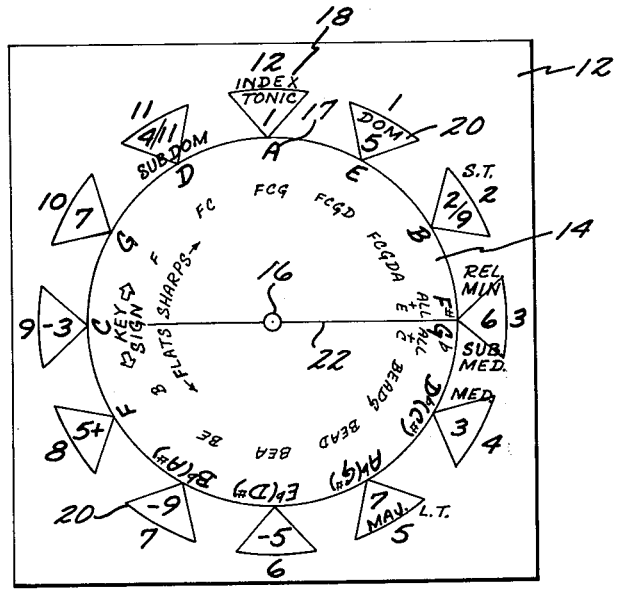
FIG. 2 illustrates the device with the musical note A at the index mark.

The calculating device of the invention can also be used for transposing chords or notes from one key into another key. This can be performed in the manner illustrated in FIGS. 1 and 2. In this example, it is desired to transpose a musical selection having the following sequence of chords: C, E$^7$, A$^7$, D$^7$, G$^7$, C from the key of C to the key of A. As shown in FIG. 1, the aforementioned sequence of chords appear opposite the following indicia: index, three, six, two/nine, five and index. To transpose the chord sequence from the key of C to the key of A, disc 14 is rotated so that note A of the circular array of musical note indicia on disc 14 is positioned beneath the index indicium which appears on base member 12. When disc 14 is rotated into this position, the aforementioned sequence of indicia are then employed to determine the new sequence of chords for the key of A to be: A, C$^{\#7}$, F$^{\#7}$, B$^7$, E$^7$, and A. One can, therefore, readily transpose a chord or note sequence to any desired key.

Figure 3:
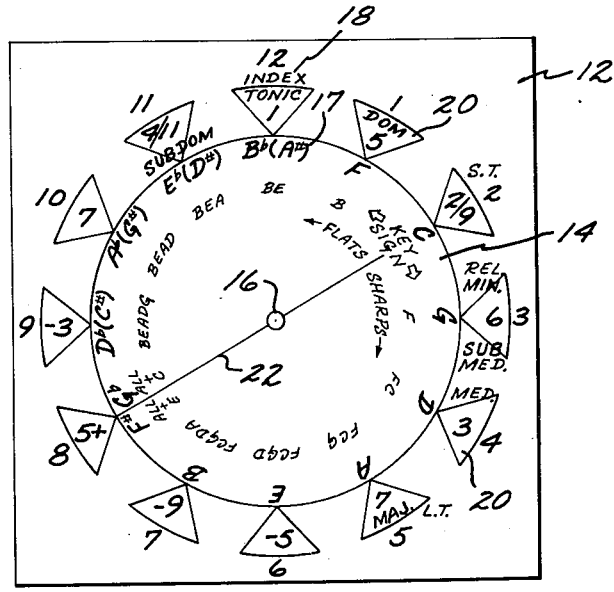
FIG. 3 illustrates the device with the musical note B flat at the index mark.

The calculating device can also be employed for chord analysis when only incomplete information is available on the notes of particular chords. Thus if one wished to identify a chord of five notes in which the identity of one or more of the notes is unknown, the calculating device can be employed to determine the chord having the best fit with the known notes. To illustrate, it is desired to identify a chord having five notes in which three notes are known to be D, F and E flat and the other two notes are unknown. FIG. 3 illustrates use of the calculating device by the rotation of disc 14 to align note D of the indicia of disc 14 opposite the three indicium appearng on the base member 12. The third note of the chord, F, is then observed to be in its correct alignment with the five indicium appearing on the base member 12 and the note E flat is observed to the opposite the four/eleven indicium at the 11 o'clock position of base member 12. The key note is then observed to be B flat which appears at the index. Accordingly, the chord can be B flat seventh with an added eleventh note. Other possible chords which could fit the limited known elements would be the D minor seventh chord with a flatted ninth note obtained by positioning note D under the index or the G seventh with a raised fifth note obtained by positioning note D under five indicium.

The calculating device can also be used to determine chords whose root tones are based on the tones of a given major scale. Thus, if the key of C is chosen and the disc 14 is positioned as shown in FIG. 1, the major triad of the tonic is identified as C, E and G. If it is desired to obtain the root of submediant chord, one observes that the note A is opposite the submed. indicium which appears at the 3 o'-clock position on base member 12. Similar procedures can be used to identify the root tones of the chords of the subdominant, dominant, mediant, and supertonic scale opposite the index.

The device has thus been illustrated as useful in the spelling of chords and scales, transposing of chords or notes from one key to another key, identification of chords from incomplete knowledge thereof and in transposing of chords from one scale to another harmonic scale.

The invention has been described with reference to the particularly illustrated and presently preferred mode of practice thereof. It is not intended to this illustration that the invention be unduly limited. Instead, it is intended that the invention be defined by the means and their obvious equivalents set forth in the following claims.

What is claimed is:

1. A device of the slide rule type useful in music analysis which comprises:
   (1) a base plate member;
   (2) a circular disk member mounted thereon;
   (3) a first series of 12 indicia, representative of the 12 notes of an octave of the musical scale disposed on one of said members in a circle of fifths progression;
   (4) a second series of 12 indicia cooperative with the first series of indicia, including note identifying indicia; and
   (5) an index and a plurality of 11 calibration marks in circular progression therefrom on the other of said members including a common identifying color at the index mark and representative of the root note, at the fourth calibration mark and representative of the second note, and at the first calibration mark and representative of the third note of a major triad musical chord, and a lighter shade of said identifying color at the tenth calibration mark to identify the fourth note of a dominant seventh card.

2. A device of the slide rule type useful in music analysis which comprises:
   (1) a base plate member;
   (2) a circular disk member mounted thereon;
   (3) a first series of 12 indicia, representative of the 12 notes of an octave of the musical scale disposed on one of said members in a circle of fifths progression;
   (4) an index and a plurality of 11 calibration marks in circular progression therefrom on the other of said members; and
   (5) a second series of 12 indicia cooperative with the first series of indicia, including note identifying indicia one at the index mark and representative of the root note, a second at the fourth calibration mark and representative of the second note, a third at the first calibration mark a representative of the third note of a major triad musical chord and said other member bears an indicium at the ninth calibration mark which is cooperative with the indicia at the index and first calibration mark to identify the notes of a minor triad.

3. A device of the slide rule type useful in music analysis which comprises:
   (1) a base plate member;
   (2) a circular disk member mounted thereon;
   (3) a first series of 12 indicia, representative of the 12 notes of an octave of the musical scale disposed on one of said members in a circle of fifths progression;
   (4) a second series of 12 indicia cooperative with the first series of indicia; and
   (5) an index and a plurality of 11 calibration marks in circular progression therefrom on the other of said members including a common identifying color at the index mark and representative of the root note, at the fourth calibration mark and representative of the second note, and at the first calibration mark and representative of the third note of a major triad musical chord, and a complementary color at the ninth calibration mark.

4. A device of the slide rule type useful in music analysis which comprises:
   (1) a base plate member;
   (2) a circular disk member mounted thereon;
   (3) a first series of 12 indicia; representative of the 12 notes of an octave of the musical scale disposed on said circular disk member in a circle of fifths progression;
   (4) an index and a plurality of 11 calibration marks in circular progression therefrom on the other of said members; and
   (5) a second series of 12 indicia cooperative with the first series of indicia, including note identifying indicia one at the index mark and representative of the root note, a second at the fourth calibration mark and representative of the second note, a third at the first calibration mark and representative of the third note of a major triad musical chord and said other member bears an indicium at the sixth calibration mark cooperative with the indicium at the ninth calibration mark to identify the notes of a diminished chord.

5. A device of the slide rule type useful in music analysis which comprises:
   (1) a base plate member;
   (2) a circular disk member mounted thereon;
   (3) a first series of 12 indicia, representative of the 12 notes of an octave of the musical scale disposed on one of said members in a circle of fifths progression;
   (4) an index and a plurality of 11 calibration marks in circular progression therefrom on the other of said members; and
   (5) a second series of 12 indicia cooperative with the first series of indicia, including note identifying indicia one at the index mark and representative of the root note, a second at the fourth calibration mark and representative of the second note, a third at the first calibration mark and representative of the third note of a major triad musical chord and said other member bears an indicium at the eighth calibration mark which is cooperative with said indicia at the index and fourth calibration mark to identify the notes of an augmented fifth chord.

6. A device of the slide rule type useful in music analysis which comprises:
   (1) a base plate member;
   (2) a circular disk member mounted thereon;
   (3) a first series of 12 indicia, representative of the 12 notes of an octave of the musical scale disposed on one of said members in a circle of fifths progression;
   (4) an index and a plurality of 11 calibration marks in circular progression therefrom on the other of said members; and
   (5) a second series of 12 indicia cooperative with the first series of indicia, including note identifying indicia one at the index mark and representative of the root note, a second at the fourth calibration mark and representative of the second note, a third at the first calibration mark and representative of the third note of a major triad musical chord and said other member bears an indicium at the sixth calibration mark to identify a flatted fifth note.

7. The device of claim 6 wherein said other member bears an indicium at the seventh calibration mark to identify a flatted ninth note.

8. The device of claim 7 wherein said sixth and seventh calibration marks have shades of a common, blue color to identify cool, jazzy notes.

9. A device of the slide rule type useful in music analysis which comprises:
   (1) a base plate member;
   (2) a circular disk member mounted thereon;
   (3) a first series of 12 indicia, representative of the 12 notes of an octave of the musical scale disposed on one of said members in a circle of fifths progression;
   (4) an index and a plurality of 11 calibration marks in circular progression therefrom on the other of said members; and
   (5) a second series of 12 indicia cooperative with the first series of indicia, including note identifying indicia one at the index mark and representative of the root note, a second at the fourth calibration mark and representative of second note, a third at the first calibration mark and representative of the third note of a major triad musical chord and said other member bears indicia at the ninth and tenth calibration marks cooperative with said indicia at said index and first calibration marks to identify the notes of a minor seventh chord.

10. A device of the slide rule type useful in music analysis which comprises:
    (1) a base plate member;
    (2) a circular disk member mounted thereon;
    (3) a first series of 12 indicia, representative of the 12 notes of an octave of the musical scale disposed on one of said members in a circle of fifths progression;
    (4) an index and a plurality of 11 calibration marks in circular progression therefrom on the other of said members; and
    (5) a second series of 12 indicia cooperative with the first series of indicia, including note identifying indicia one at the index mark and representative of the root note, a second at the fourth calibration mark and representative of the second note, a third at the first calibration mark and representative of the third note of a major triad musical chord and said other member bears indicia at the third, sixth and ninth calibration marks cooperative with the indicium at the index mark to identify the notes of a diminished seventh chord.

11. A device of the slide rule type useful in music analysis which comprises:

(1) a base plate member;
(2) a circular disk member mounted thereon;
(3) a first series of 12 indicia, representative of the 12 notes of an octave of the musical scale disposed on one of said members in a circle of fifths progression;
(4) an index and a plurality of 11 calibration marks in circular progression therefrom on the other of said members;
(5) a second series of 12 indicia cooperative with the first series of indicia, including note identifying indicia one at the index mark and representative of the root note, a second at the fourth calibration mark and representative of the second note, a third at the first calibration mark and representative of the third note of a major triad musical chord and said other member bears an indicium at the fifth calibration mark cooperative with said indica at said index, fourth and first calibration marks to identify the notes of a major seventh chord.

12. The device of claim 11 wherein said fifth calibration mark has a blue color to identify a cool jazzy note.

13. A device of the slide rule type useful in music analysis which comprises:
(1) a base plate member;
(2) a circular disk member mounted thereon;
(3) a first series of 12 indicia, representative of the 12 notes of an octave of the musical scale disposed on one of said members in a circle of fifths progression;
(4) an index and a plurality of 11 calibration marks in circular progression therefrom on the other of said members;
(5) a second series of 12 indicia cooperative with the first series of indicia, including note identifying indicia one at the index mark and representative of the root note, a second at the fourth calibration mark and representative of the second note, a third at the first calibration mark and representative of the third note of a major triad musical chord;
(6) indicia at the eleventh and first calibration mark to identify, respectively, the subdominant and dominant chords of a key whose root note is positioned at the index indicium; and
(7) indicia at the second, third, fourth and fifth calibration marks to identify the root notes, respectively, of the supertonic submediant and mediant chords and leading tone of the scale positioned at the index indicium.

* * * * *